United States Patent Office 2,969,352
Patented Jan. 24, 1961

2,969,352

ANTIBIOTIC COMPOUNDS

Simon L. Ruskin, New York, N.Y., assignor to Union Carbide Corporation, New York, N.Y., a corporation of New York No Drawing. Filed Jan. 25, 1955, Ser. No. 484,079

11 Claims. (Cl. 260—210)

My invention relates to water soluble compounds of antibiotic agents of the group characterized mainly by bacteriostatic rather than bactericidal properties. This group comprises mainly erythromycin, carbomycin and tetracycline.

This is a continuation-in-part of my preceding application, Serial Number 479,235, filed December 31, 1954, now abandoned.

The preparation of water soluble compounds that would retain their potency had been sought since the discovery of erythromycin and carbomycin. Another unfavorable characteristic has been an extremely bitter taste. In my preceding application, Serial No. 471,090, filed November 24, 1954, I disclosed the water soluble ascorbate of erythromycin. This salt, however, still possessed some bitter taste. Various attempts to overcome this bitter taste have led to the preparation of a number of esters of hydrocarbons and reactions with anhydrides of fatty acids and addition salts. The situation was summerized by an article by Hubert W. Murphy of the Eli Lilly Company in a symposium on antibiotics and published in The Antibiotics Annual 1953–54, pages 500. He stated that the "recently discovered Broad Spectrum Antibiotic, erythromycin, has been employed with considerable clinical success in the treatment of a number of infections. Although the antibiotic is not very soluble in water, it displays a characteristic and persistent bitter taste and is readily inactivated by acidic aqueous media. It has therefore been customarily administered as an enteric coated tablet, but it would be desirable to obtain a tasteless preparation of erythromycin with greater stability toward acids that would give satisfactory blood levels when administered by mouth."

I have found that it is possible not only to provide an ester that is more palatable but is at the same time freely water soluble and has the very desirable pH range of 7.5 to 8 at which level erythromycin is most stable. Hitherto soluble salts of erythromycin occurred on the acid side which is the less stable pH range. The same reaction is obtainable with carbomycin and tetracycline.

To produce my compound I react erythromycin base or carbomycin base or tetracycline base with B sulphopropionic acid anhydride whereby under anhydrous conditions at room temperature in the presence of an alkali hydroxide there is formed the sodium salt of erythromycin with sulpho propionic acid. The salt is freely water soluble, stable, and retains the full activity of the erythromycin.

While B sulphopropionic anhydride has an unpleasant mercapto odor, yet it combines with the bitter taste of the erythromycin to produce quite a new taste that is more pleasant than erythromycin itself. On the other hand, the water solubility and the practically neutral to slightly alkaline pH makes it well suited for application to mucous membranes as a nasal drop or for intramuscular injection as well as for syrups. These properties have hitherto been unattainable with erythromycin or carbomycin. While soluble solutions of tetracycline can be made with acids, it has not been possible to make the sodium salt. By my procedure a sodium salt of tetracycline is made that is more suitable for intramuscular injection than the hydrochloride presently used.

In my procedure either the base of erythromycin, carbomycin or tetracycline can be used, or the compounds can be produced by double decomposition.

Instead of sodium hydroxide, the hydroxides of other alkali metals such as potassium or of the alkaline earth metals such as calcium may be used.

The following examples are descriptive of my procedure and are not intended to limit the scope of the reactants that may be used either as solvents or catalysts.

A graphic formula of the B sulfopropionic acid anhydride is as follows:

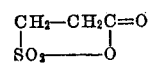

Example I 1.570 grams of the anhydride of B sulfopropionic acid and 8.50 grams of erythromycin were dissolved in a mixture of 50 ml. of ethyl alcohol and 25 ml. of dioxane. The solution was concentrated down to a solid.

The concentrated powder was now redissolved with 50 cc. dioxane to which had been added 5.75 ml. of 2 NaOH. The solution was evaporated to dryness in vacuo yielding a white crystalline material. Under the microscope the crystals appeared to be flat and plate-like. The product is readily soluble in water giving a pH of 7.5 and is clear watery with a very slight bluish cast.

Bacteriological testing shows the product to be active against *Micrococcus pyogenes* var. *aureus* in dilutions of 1:100,000 to 1:1,000,000. It can thus be included as an effective antibiotic.

Example II 1.0 g. of tetracycline base and 0.28 g. of B sulfopropionic acid anhydride were dissolved in a mixture of 50 ml. of ethyl alcohol and 25 ml. of dioxane. The solution was concentrated down to a solid. The product was then redissolved in a solution of 50 ml. dioxane containing 5 ml. of 2 N NaOH. The solution was concentrated and evaporated to dryness in vacuo. The product was a light yellow powder with an aromatic odor.

Example III 8.5 grams of carbomycin base and 1.5 grams of the B sulfopropionic acid anhydride were dissolved in a solution of 100 cc. dioxane to which had been added 5.8 ml. of 2 N NaOH. The whole was stirred until the solids went into solution. It was then concentrated down and evaporated in vacuo to dryness. A white crystalline product resulted. The odor of the material was not unpleasant.

Example IV 785 mg. of sulfopropionic anhydride and 4.25 grams of erythromycin base were dissolved in 75 ml. of ethyl alcohol. Enough Ca(OH)$_2$ solution was added until the pH was raised to 7.0–7.2. This required 130 ml. of Ca(OH)$_2$ solution. The whole went into solution. The solution was evaporated to dryness yielding a fluffy white powder.

Assay against *Micrococcus pyogenes* var. *aureus* showed activity in dilutions of 1:100,000 to 1:1,000,000.

I claim:

1. The sodium salt of the reaction product of B sulfopropionic anhydride and erythromycin.

2. The sodium salt of the reaction product of carbomycin and B sulfopropionic anhydride.

3. The sodium salt of the reaction product of tetracycline and B sulfopropionic anhydride.

4. The reaction product of B sulfopropionic anhydride and erythromycin.

5. The reaction product of carbomycin and B sulfopropionic anhydride.

6. The reaction product of tetracycline and B sulfopropionic anhydride.

7. The product of the reaction in an anhydrous medium in the presence of an alkali hydroxide of erythromycin base and B sulfopropionic anhydride.

8. The product of the reaction in an anhydrous medium in the presence of an alkali hydroxide of carbomycin base and B sulfopropionic anhydride.

9. The product of the reaction in an anhydrous medium in the presence of an alkali hydroxide of tetracycline base and B sulfopropionic anhydride.

10. The reaction product of B sulfopropionic anhydride with a substance selected from the group consisting of erythromycin, carbomycin and tetracycline.

11. The product of the reaction in an anhydrous medium in the presence of a substance selected from the group consisting of alkali and alkaline earth hydroxides of B sulfopropionic anhydride with a substance selected from the group consisting of erythromycin, carbomycin and tetracycline.

References Cited in the file of this patent
UNITED STATES PATENTS

| | | |
|---|---|---|
| 2,653,899 | Bunch et al. | Sept. 29, 1953 |
| 2,699,054 | Conover | Jan. 11, 1955 |

OTHER REFERENCES

Hochstein et al.: J. Am. Chem. Soc., vol. 75 (1953), pp. 5456 and 5468.

Hochstein et al.: J. Am. Chem. Soc., vol. 76, October 20, 1054, pp. 5080 to 5082 (received April 29, 1954).

Flynn et al.: J. Am. Chem. Soc., vol. 76, June 20, 1954, pp. 3121–3126 (received January 16, 1954).

Antibiotics Annual, 1953–1954, December 1953, pp. 514–521.